United States Patent
Taylor et al.

(10) Patent No.: US 8,706,419 B1
(45) Date of Patent: Apr. 22, 2014

(54) SYSTEM AND METHOD FOR MONITORING THE CHANGE IN PERMEABILITY OF A WATER WELL

(71) Applicant: William C. Frazier, Muskego, WI (US)

(72) Inventors: Robert W. Taylor, Saukville, WI (US); William C. Frazier, Muskego, WI (US)

(73) Assignee: William C. Frazier, Muskego, WI (US)

( * ) Notice: Subject to any disclaimer, the term of this patent is extended or adjusted under 35 U.S.C. 154(b) by 0 days.

(21) Appl. No.: 13/894,365

(22) Filed: May 14, 2013

(51) Int. Cl.
*G01V 1/40* (2006.01)
*G01V 1/50* (2006.01)
G01V 1/48 (2006.01)
G01V 1/30 (2006.01)
G01V 11/00 (2006.01)
E21B 49/00 (2006.01)

(52) U.S. Cl.
CPC ... *G01V 1/50* (2013.01); *G01V 1/48* (2013.01); *G01V 1/306* (2013.01); *G01V 11/00* (2013.01); *E21B 49/00* (2013.01)
USPC .................................. 702/11; 702/6; 702/14

(58) Field of Classification Search
CPC ........... G01V 1/48; G01V 1/50; G01V 1/306; G01V 11/00; E21B 49/00
USPC .................................................. 702/6, 11, 14
See application file for complete search history.

(56) References Cited

U.S. PATENT DOCUMENTS

| | | | |
|---|---|---|---|
| 3,628,011 A | * | 12/1971 | Wyman ......................... 376/167 |
| 5,432,446 A | * | 7/1995 | MacInnis et al. ............. 324/303 |
| 5,579,845 A | | 12/1996 | Jansen et al. |
| 5,769,164 A | | 6/1998 | Archer |
| 6,029,746 A | | 2/2000 | Dodd |
| 6,460,618 B1 | | 10/2002 | Braithwaite et al. |
| 6,533,035 B2 | | 3/2003 | Troutt et al. |
| 7,321,527 B2 | | 1/2008 | Hopperstad et al. |
| 7,518,953 B2 | | 4/2009 | Hegna et al. |
| 7,770,638 B2 | | 8/2010 | Kabishcher et al. |
| 8,082,989 B2 | | 12/2011 | Kabishcher et al. |
| 8,279,711 B2 | | 10/2012 | Nance et al. |
| 2004/0031318 A1 | * | 2/2004 | Kurkjian et al. ............ 73/152.51 |
| 2006/0050614 A1 | | 3/2006 | Hopperstad et al. |
| 2006/0108111 A1 | | 5/2006 | Kas'yanov |
| 2008/0205191 A1 | | 8/2008 | Coste et al. |
| 2009/0114009 A1 | * | 5/2009 | Thambynayagam et al. .......................... 73/152.51 |
| 2010/0254218 A1 | * | 10/2010 | Dorovsky et al. ............... 367/38 |

* cited by examiner

*Primary Examiner* — Sujoy Kundu
*Assistant Examiner* — Paul D Lee
(74) *Attorney, Agent, or Firm* — Michael Best & Friedrich LLP

(57) ABSTRACT

A system and method for monitoring the permeability of a well structure defining a bore hole. The system comprises a wave generator, a sensor adapted to receive current wave data, and a processor programmed to compare the current wave data to prior wave data in order to determine the permeability of the well structure. The processor can calculate a correlation value and/or a decay value that reflects changes between the current wave data and the prior wave data, and these values can be displayed for the user. The method comprises creating a pressure wave in the bore hole, sensing current wave data, and comparing the current wave data to prior wave data in order to determine the permeability of the well structure. The step of comparing can include calculating a correlation value and/or a decay value that corresponds with the change in the data, and the values can be displayed.

15 Claims, 4 Drawing Sheets

SYSTEM AND METHOD FOR MONITORING THE CHANGE IN PERMEABILITY OF A WATER WELL

BACKGROUND

The present invention relates generally to the maintenance and rehabilitation of water wells and specifically to systems and methods for monitoring the change in permeability of the well structure (e.g., screen, gravel pack, and geological formations) surrounding boreholes which can influence the water production capability of water wells.

Bore holes are commonly drilled into the ground in order to locate and extract water from water-bearing geological formations. Specifically, the bore hole allows the extraction of ground water from intergranular pore spaces, fractures and cavities that naturally occur in various geologic formations. Screens, gravel packs, and other structures can be inserted into the bore hole in order to create a well structure. The inherent ability of the well structure to transmit ground water is known as hydraulic conductivity or permeability. Well structures, whether vertical or horizontal, provide a method for the water to collect and be accessed. Various types of pumps can be installed in wells to extract the water or other liquids. Over time, the side walls of the well structure can become clogged or contaminated with matter, thereby inhibiting the ability of the water to flow into the borehole. In order to alleviate this problem, the side walls of the well structure can be cleaned in order to remove the clogging and/or plugging matter. One such way of removing the clogging and/or plugging matter is by a system known commercially as Airburst® available from Airburst Technology, LLC of Muskego, Wis. The basic principles of this technology are disclosed in U.S. Pat. No. 5,579,845, which is hereby incorporated by reference in its entirety.

In order to determine whether or not existing well-cleaning systems are effective, it is also known to install a pump in the well after cleaning to determine any changes in the permeability of the well, such as by measuring the specific capacity (gallons per minute per foot of liquid drawdown) of the well and thus determine the effectiveness of the cleaning process. This requires removal of the cleaning equipment and can involve many hours or days of intensive labor to install the pump. If it is determined by pumping that additional cleaning is required, the pump must be removed and the cleaning equipment reinstalled in the bore hole. This time and labor consuming procedure is undesirable as an intermediate step in the cleaning process.

It is also known to insert a video camera into the well after the cleaning operation. This commonly involves removing the cleaning apparatus and then inserting the video camera into the well to visually determine the effectiveness of the cleaning operation. It is also known to position the video camera in the well along with the cleaning apparatus so that removal of the cleaning apparatus is unnecessary. In either case, the use of a video camera relies on visual verification of the cleaning operation, which is not the most accurate way to determine the effectiveness of a cleaning operation. In addition, one must wait for the clogged and/or plugged matter in the well (which was removed during the cleaning operation) to settle to the bottom of the well so that the video camera can clearly see the sidewall of the well structure and visually determine the effectiveness of the cleaning operation. This waiting period is undesirable.

SUMMARY

The present invention provides a system and method for monitoring the change in permeability of a water well bore hole. The system comprises a wave generator (e.g., an acoustic wave generator, such as an air gun) adapted to be positioned in the bore hole, a sensor (e.g., a pressure sensor, a seismic sensor, a temperature sensor, or a fluid level sensor) adapted to receive wave data generated by the wave generator, and a processor coupled to the sensor and programmed to compare wave data (e.g., prior and current wave data) in the bore hole (e.g., at a specific location) in order to determine the change in permeability of the well structure. Preferably, the wave generator includes a cable for suspending the wave generator in the bore hole, and the sensor is supported by the same cable.

In one embodiment, the processor is programmed to use the wave data to calculate a correlation value that reflects changes between the wave data. In addition, the processor can be programmed to use the wave data to calculate a waveform decay value that reflects changes between the wave data. Either or both of these values (or some derivative of those calculations) can be displayed for the user to determine the effectiveness of the cleaning operation.

The method comprises creating a pressure wave (e.g., an acoustic wave generated by an air gun suspended in the bore hole) in the well structure, sensing wave data generated by the pressure wave (e.g., using a pressure sensor, a seismic sensor, a temperature sensor, or a fluid level sensor suspended in the bore hole), and comparing the wave data in the bore hole (e.g., at a specific location) in order to determine the change in permeability of the well structure. The step of comparing can include calculating a correlation value that reflects a correlation between the wave data or calculating a decay value that corresponds with the rate of decay of the waveform data. The method can further include displaying the correlation value and/or decay value so that the values can be compared by the user to determine the effectiveness of the cleaning operation.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
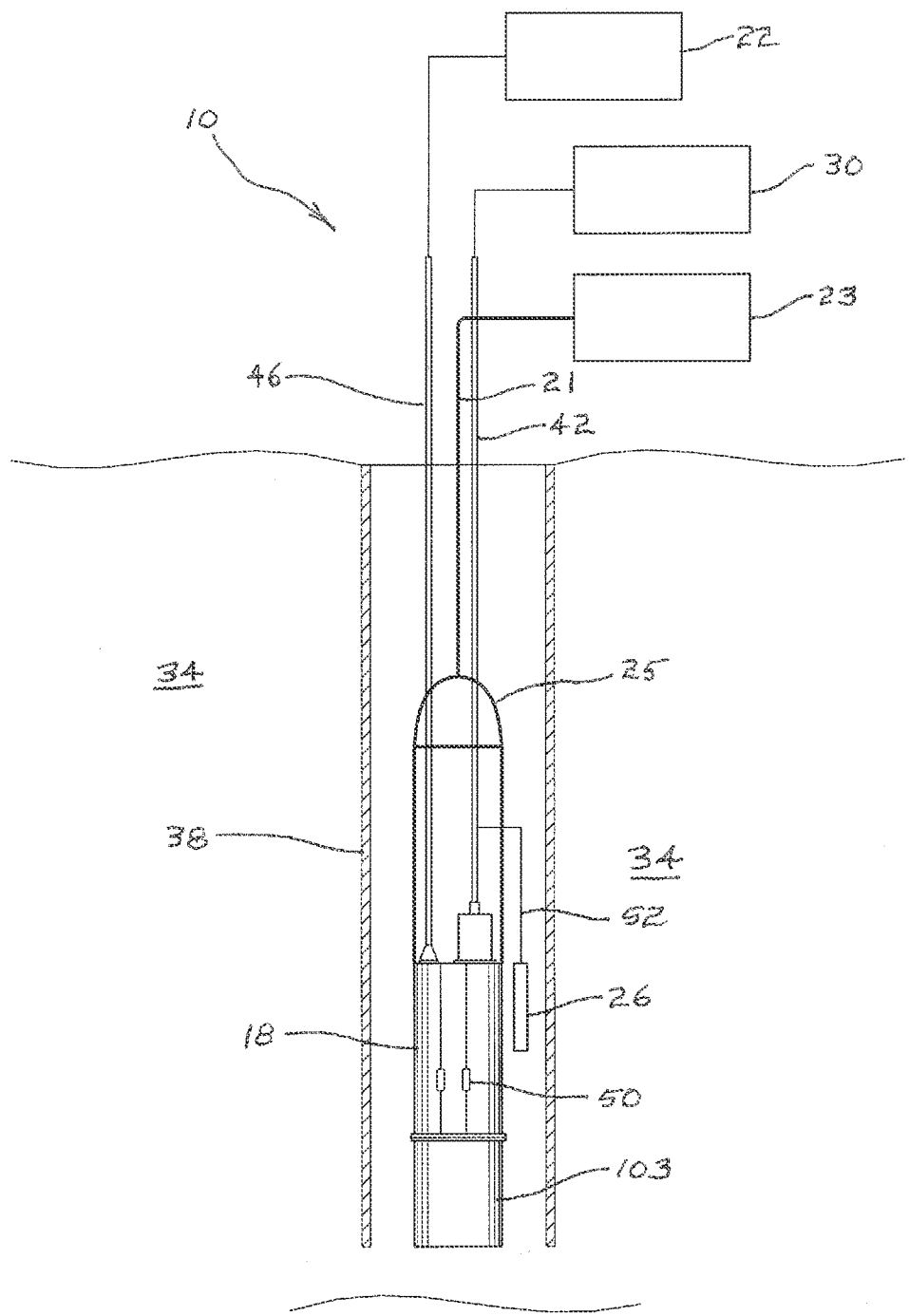
FIG. 1 is a schematic partial cross-sectional view of a system for monitoring the production capability of a bore hole according to an embodiment of the invention.

FIG. 1 illustrates a system 10 for monitoring the change in permeability of a well structure 12, which includes the geological formation 34 and other structure (e.g., gravel pack and screen) surrounding a bore hole 14. The system 10 includes an acoustic wave generator device 18, a gas source 22, a sensor 26, and a processor 30. The illustrated bore hole 14 is part of a borehole formed in a water-bearing geological formation 34. The bore hole 14 includes a perimeter wall 38 formed from stone, concrete, clay, sand, or any other suitable material and/or a metal screen (not shown) positioned near the bottom of the bore hole or opposite water bearing formations throughout the length of the bore hole 14. Over time, the well structure can become coated with fine grained materials, mineral and/or biological debris that impedes fluid flow into the bore hole 14.

With continued reference to FIG. 1, the acoustic wave generator device 18 (referred to herein as an "AWG device" or "AWG") is suspended in the bore hole 14 by a support cable 21 secured to a lifting hoop 25 on the AWG and is moved by a lifting winch 23. AWG devices are high-velocity, mass movement devices that generate high-amplitude acoustic waves, high-velocity mass movement, and/or seismic waves. The illustrated AWG device 18 is a rapidly-venting gas apparatus, such as a gas gun. One such gas gun is available under the BOLT® trademark, from Bolt Technology Corporation. In other embodiments, any suitable AWG device 18 may be used, such as but not limited to an air/gas gun, water gun, sparker, imploder or steam gun.

Figure 2:
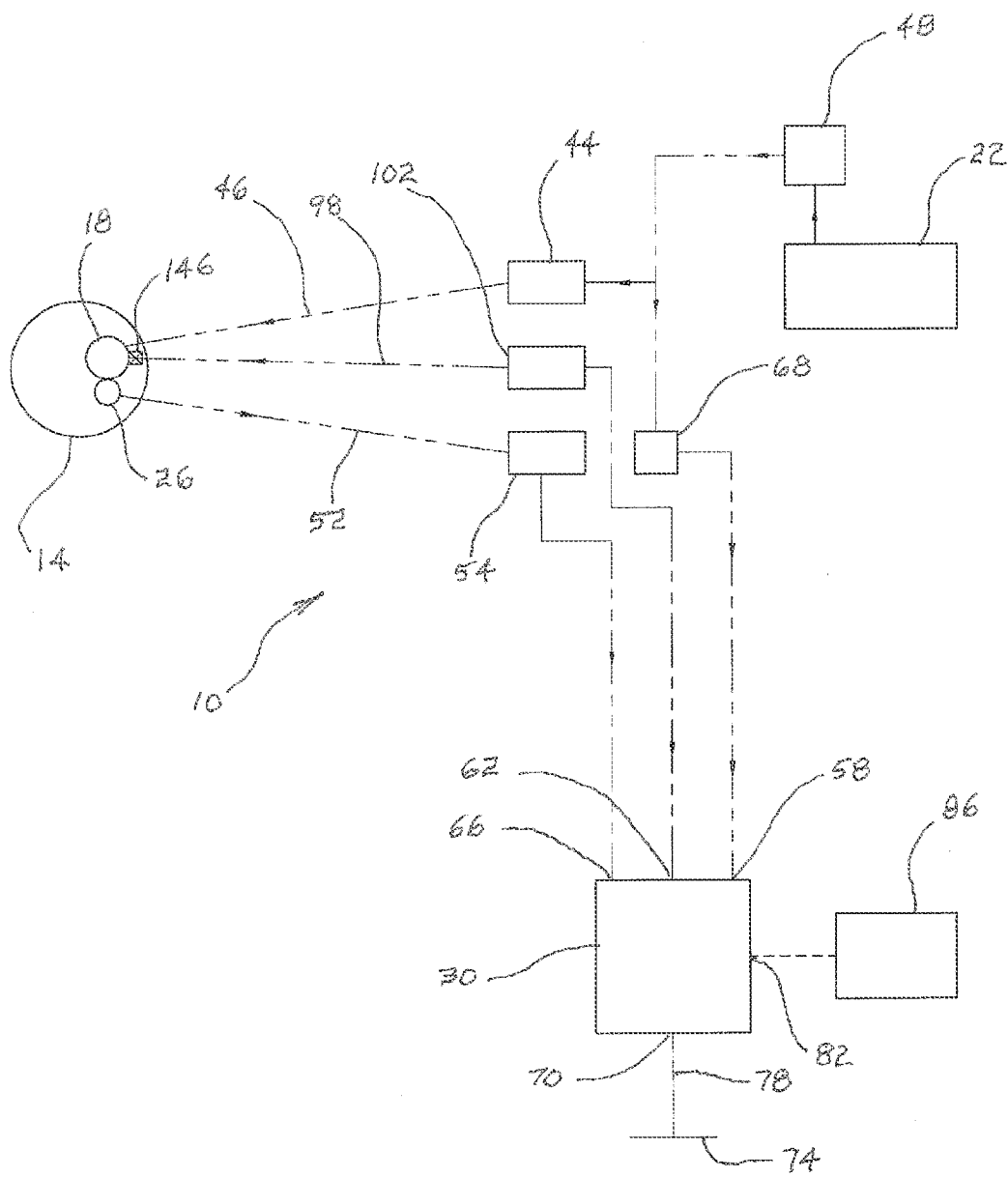
FIG. 2 is a schematic diagram of the system of FIG. 1.

The AWG device 18 is actuated via a firing wire 42 coupled between the AWG device and the processor 30. The AWG device 18 is connected to the gas source 22 by a high pressure gas line 46 routed through a hose reel 44 (FIG. 2). A pressure regulator 48 is disposed between the gas source 22 and the AWG device 18 for controlling the gas pressure supplied to the AWG device 18. The gas source 22 can be a compressor, a gas storage pressure vessel, or any suitable means for delivering high-pressure gas to the AWG device 18. The AWG device 18 includes ports 50 configured to explosively release high pressure gas as a gas bubble into a surrounding fluid within the bore hole 14 (FIG. 1). When the AWG device 18 is actuated, a sharp pressure wave is generated by a leading edge of the gas bubble. This wave impacts the well structure and vibrates the screen, gravel pack, and surrounding geological formation 34. The impact loosens the debris accumulated on the well structure.

As the gas bubble expands, the surrounding fluid is pushed at a high velocity through the well structure and displaces and agitates the debris that had been loosened by the original sharp pressure wave. Eventually, pressure from the surrounding fluid forces the overextended gas bubble to contract or recompress. The displaced surrounding fluid flows back into the bore hole 14, pulling the loosened debris through the well structure, thereby further clearing the screen, gravel pack, and geological formation 34 from the debris.

Finally, pressure within the recompressing bubble will exceed the hydrostatic pressure of the surrounding fluid, causing a secondary bubble expansion with an associated secondary pressure wave and secondary mass movement, similar to that described above. Thus, the cycle of bubble expansion followed by bubble contraction and the associated pressure and mass movement effect may repeat several times for each activation of the AWG device 18.

With continued reference to FIG. 1, the sensor 26 is positioned near the AWG device 18 to measure pressure, seismic data, temperature, or mass flow within and around the bore hole 14. In the illustrated embodiment, the sensor 26 is mounted on the AWG device 18 with a bracket (not shown). In other embodiments, the sensor 26 is suspended within the bore hole 14 separately from the AWG device 18. In yet other embodiments, the sensor 26 is positioned outside the bore hole 14 (e.g., at the surface to measure seismic data).

In the illustrated embodiment, the sensor 26 is a pressure transducer, such as the Miniature 4-20 mA Output IS Pressure Transducer, ETM-200-375M series, made by Kulite Semiconductor Products, Inc. or the VersaLine VL1000 Series pressure, depth and level transmitter, made by Process Measurement & Controls, Inc. In other embodiments, the sensor 26 can be a hydrophone or other suitable device. The sensor 26 can include a single device, or the sensor 26 can include multiple devices, including a temperature sensor, employed discretely or within an array.

The sensor 26 provides feedback to the processor 30 to evaluate the change in permeability of the well structure. The sensor 26 communicates with the processor 30 via a sensor cable 52 routed through a cable reel 54 (FIG. 2). The sensor 26 can be configured to measure any of the following, alone or in combination with one another: seismic activity near the well structure, water temperature in the borehole, acoustic energy near the well structure, fluid level or mass movement within the bore hole 14, pressure waves and/or temperature within the bore hole 14. As will be described in further detail below, changes in any of these dynamic measurements can be related to positive or negative changes in the permeability of the well structure. As such, the sensor 26 provides feedback relevant to the control and operation of the AWG device 18.

In the illustrated embodiment, the change in permeability of the well structure is gauged through the measurement of dynamic pressure waves within the fluid of the bore hole 14. Following activation of the AWG device 18 as described above, the high pressure wave impacts the well structure (i.e., the screen, gravel pack, geological formation, and any other structure surrounding the bore hole). This energy will then be reflected back towards the AWG device 18. Measurements of the reflected energy (pressure) can be used to determine the resistance of flow through the well structure. A decrease in the reflected wave energy would mean that more energy is being transmitted through the well structure, which would indicate the impediments to fluid flow have decreased. Hence, if the cleaning operation is potentially improving the permeability of the well structure, successive cleaning operations will result in a decrease in the reflected wave pressure. When the decreasing reflected wave pressure stabilizes, it is usually an indication that little or no further permeability improvement can be achieved using the current cleaning operation and parameters. Failure to initially decrease the reflected energy wave can indicate that the well structure cannot be improved or the necessity for changing the AWG operational parameters.

In other embodiments, the change in permeability of the well structure can be gauged through the measurement of mass movement. For the illustrated embodiment of the AWG device 18, the gas bubble will push displaced fluid through the well structure at a rate corresponding with the permeability of the well structure. The fluid movement not absorbed by the well structure is directed up the bore hole 14, thereby temporarily raising the fluid level in the bore hole 14. Accordingly, a large rise in the fluid level within the bore hole 14 would indicate a low permeability through the well structure, indicating the presence of large amounts of deposited mineral and/or biological debris. Conversely, low or decreasing levels of fluid rise in the bore hole 14 would indicate lesser flow resistance and improved permeability. Thus, the measurement of fluid movement resulting from activation of the AWG device 18 can provide feedback to determine the success of the AWG device 18 operation and to ascertain whether modifications to operational parameters of the AWG device 18 are required.

In another embodiment, the change in permeability of the well structure can be gauged through the measurement of water temperature in the bore hole. In this embodiment, the processor receives data from a temperature sensor in the bore hole and would compare the temperature of the water in the bore hole prior to the cleaning operation to the temperature of the water in the bore hole after the cleaning operation. With an increase in permeability, one would expect to see a drop in water temperature caused by an increase in water flow from the surrounding geological formation. Thus, a decreasing water temperature would be an indication of improved permeability of the well structure.

Figure 3:
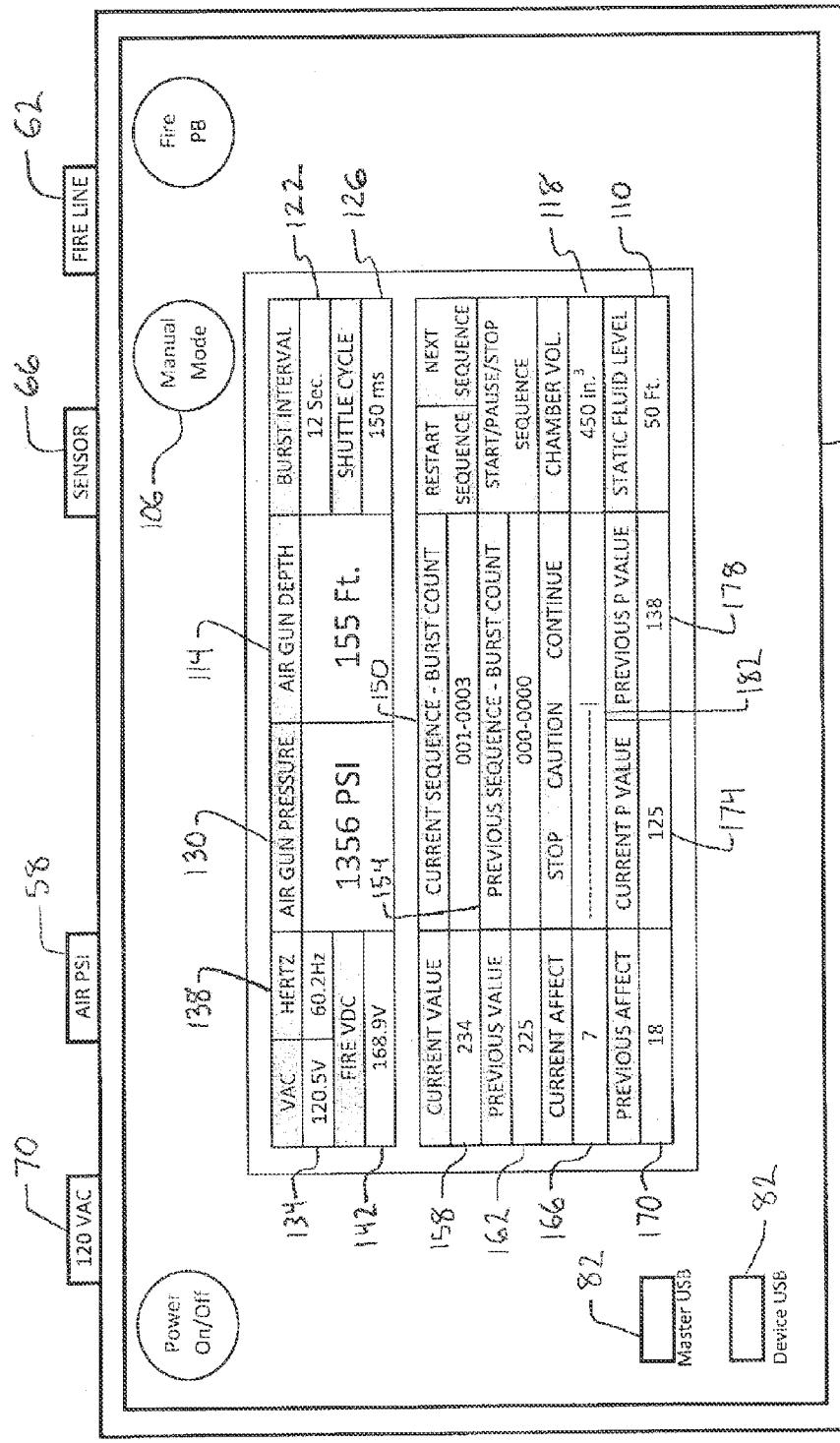
FIG. 3 is a front view of a processor of the system of FIG. 1.

With reference to FIGS. 2 and 3, the processor 30 can be any suitable computer, mobile device, or computer based control and display unit and is preferably a ruggedized, water resistant unit. The processor 30 is operable to collect and store data from all associated sensors 26, to control the firing of the AWG device 18, to set operational parameters, and to display mathematically-processed data. The processor 30 includes a data collection system (not shown), a user interface 56 (30 and 56 are physically the same device), and communication ports 58, 62, 66 for communicating with the gas source 22, the AWG device 18, and the sensor 26, respectively. Any number of signal conditioners, amplifiers, sensors, or other intermediate devices 68 can be included between the processor 30 and the gas source 22, the AWG device 18, and/or the sensor 26. In other embodiments, the processor 30 can communicate with the gas source 22, the AWG device 18, and/or the sensor 26 wirelessly. The processor also includes a power input 70 for receiving power from a conventional AC power source 74 via a power cord 78. Any other type of power source, such as a battery, can also be used.

The processor 30 records pressure measurements taken by the sensor 26. In other embodiments, the processor 30 records other measurements, such as seismic and/or acoustic energy near the bore hole 14, fluid movement within the bore hole 14, or water temperature in the bore hole. The sensor 26 transmits measurements to the processor 30 for storage in the data collection system, such as solid-state memory and/or mechanical memory (e.g., a hard drive). The processor also includes USB connection docks 82 that allow for attachment of a USB device 86 to download the collected data, including operational parameters and the data collected by the sensor 26.

Figure 4:
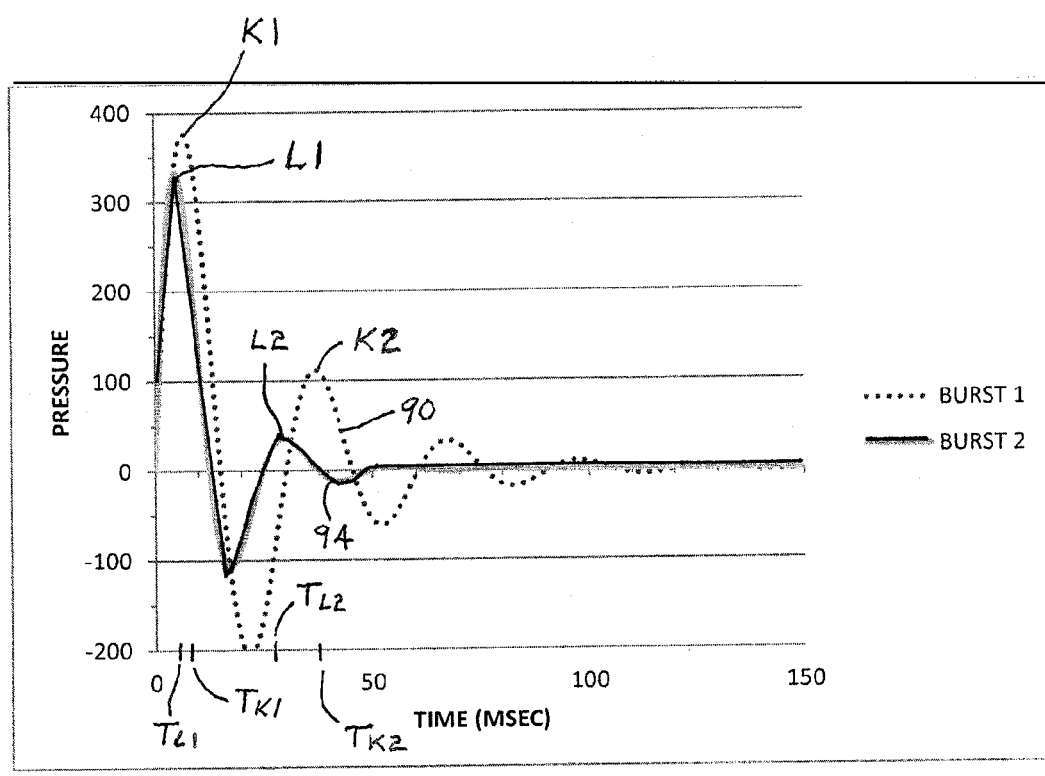
FIG. 4 is an exemplary graph of pressure versus time as measured by a sensor of the system of FIG. 1.

The sensor 26 continuously measures the pressure within the bore hole 14 during the AWG activation, and the processor 30 digitizes the continuous measurement into a set of pressure data including a plurality of discrete pressure values over time. An exemplary graph of the set of pressure data for two, successive AWG activations is illustrated in FIG. 4. The graph includes a solid line 90 representing a set of pressure data corresponding with a first activation of the AWG device 18 and a dashed line 94 representing a set of pressure data corresponding with a second activation of the AWG device 18 following the first activation, within the same bore hole 14. The number of pressure values in each set of measurement data is a function of the sampling rate of the processor 30 and the duration of a particular AWG activation.

With reference to FIG. 2, the processor 30 is connected to the AWG device 18 via a firing cable 98 that is routed through a firing cable reel 102. This connection allows for control of the AWG device 18 through the processor 30 (e.g., through the user interface 56). The user interface 56 employs touch screen technology such that some or all user inputs to the processor 30 are achieved through touching an appropriate screen area (FIG. 3). In other embodiments, the user interface 56 can include push buttons, switches, knobs, or other input means in conjunction with a viewing screen or other visual indicator.

Now referring to FIG. 3, the processor 30 offers both manual and automatic operation options. To manually activate the AWG device 18, the user simply touches a manual mode icon 106. To configure automatic operation of the AWG device 18, the user inputs various operational parameters to the user interface 56 to direct the AWG device operation. In particular, the user can enter a static fluid level 110 (the distance from the ground surface or the top of the bore hole 14 to the static fluid level in the well), a depth 114 of the AWG device 18 below the top of the bore hole 14, a chamber volume 118 of a firing chamber 103 of the AWG device 18, a burst interval 122 (time between AWG activations), an internal AWG device cycle time 126 (time that an electrical contact closure provides power to the AWG device 18), and an AWG operational pressure 130.

The user interface also displays a variety of reference values related to the operation of the AWG device 18, including but not limited to: an incoming line voltage 134 from the AC power source 74, an incoming line frequency 138, an AWG activation voltage 142 corresponding with a solenoid 146 (FIG. 2) that fires the AWG device 18, and a current and a previous sequence burst count 150, 154 (the number of AWG activations performed in the current and previous sequences).

With continued reference to FIG. 3, the user interface 56 displays results of the AWG activations in order to indicate to the user the success of the activations in changing the permeability of the well structure. These results include, but are not limited to, a maximum pressure of the measured pressure data set for current and previous activations 158, 162, an affect of the current and previous activations 166, 170, and a percentage change in the rate of decay (referred to herein as the "P Value") of the pressure wave of the current and previous activations 174, 178. In other embodiments, the user interface 56 can also display changes in water lever and water temperature.

The current value of maximum pressure 158 shown on the user interface 56 is the maximum pressure that was transmitted through the sensor 26 during the most recent AWG activation. The previous value 162 shown is the maximum pressure that was transmitted through the sensor 26 during the previous AWG activation. The current value and the previous value of maximum pressure 158, 162 illustrated in FIG. 3 are represented in digital units (a unitless quantity). However, the values 158, 162 can be displayed in any other appropriate unit, such as feet of water. The current and previous values of maximum pressure 158, 162 offer a basic metric for determining the success or effectiveness of a particular AWG activation. Generally, for an effective AWG activation, the current value of maximum pressure 158 will be lower than the previous value 162 if debris impeding fluid flow is successfully removed. If the current value and the previous value of the maximum pressure 158, 162 are nearly equal, continued AWG activations would produce little additional improvement. However, variations in the well structure, minor variations in the relative positions of the AWG device 18 and the sensor 26, and other factors can affect the maximum pressure measured by the sensor 26 during AWG activations. In some cases (such as that illustrated in FIG. 3), the current value of the maximum pressure 158 might be higher than the previous value 162. In such an instance, the user can rely upon the other parameters described below to adjust the operational parameters or determine that the process is complete.

The processor 30 performs calculations with the pressure data sets to provide results in a useful form for indicating the success of a particular AWG activation. For example, in the illustrated embodiment, a set of base data (i.e., a set of dynamic pressure data measured by the sensor during a first activation) is compared with a set of current data (i.e., a set of dynamic pressure data measured by the sensor during a second activation). This comparison is embodied as a correlation value CV. The correlation value CV is calculated using the following equation, where P1 is a discrete measured dynamic pressure within the bore hole 14 during the course of an AWG activation, P2 is a discrete measured dynamic pressure within the bore hole 14 during the course of a subsequent AWG activation, and where n varies from 1 to the total number of dynamic pressure data points d measured by the sensor 26 during AWG activations:

$$CV = \frac{\sum_{n=1}^{d}(P1_n * P2_n)}{\sqrt{\sum_{n=1}^{d}(P1_n)^2 * \sum_{n=1}^{d}(P2_n)^2}}$$

In the present use of the correlation value, the correlation value ranges from 0 to +1, with 0 indicating that the base data and the current data have totally unrelated waves, and +1 indicating that the base data and the current data have completely identical waves. This correlation value CV (i.e., the correlation value CV for the first and second activations of the AWG device 18) is represented on the user interface 56 as the current affect 166. The affect is calculated according to the following equation:

Affect=(1−CV)*100

In the present use of affect, the affect value ranges from 0 to 100. The affect value is inversely related to the correlation value CV, meaning that a low affect value indicates that the compared waves are very similar. During a subsequent activation of the AWG device 18, a third set of dynamic pressure data is measured by the sensor 26. The current affect 166 calculated for the first and second activations becomes the previous affect 170 displayed on the user interface 56, and a new current affect 166, comparing the second and third activations, is calculated according to the equations above. This process continues for each subsequent activation of the AWG device 18.

A large disparity between the current affect 166 and the previous affect 170 indicates that AWG activation is improving the condition of the well structure, and that AWG activations should continue until the current affect 166 and the previous affect 170 converge. Once the current affect 166 and the previous affect 170 have both been reduced to a value of 10 or less, they are nearly equal and, subsequent AWG activations will provide little more improvement, and the user can decide to change the operational parameters of the AWG device 18 or that the process is complete. In the illustrated embodiment, the user interface 56 includes an indicator bar 182 to indicate to the user whether AWG activations should continue, based on the difference between the previous affect 170 and the current affect 166.

The processor 30 also calculates the rate of decay of the wave for each AWG activation to provide an additional way to determine the change in permeability of the well structure. With reference to FIG. 4, the rate of decay D1 for a first AWG activation is a function of a first peak amplitude K1 of the first pressure wave 90 measured by the sensor 26, a time $t_{K1}$ corresponding with the first peak amplitude K1, a second peak amplitude K2 of the first pressure wave 90, and a time $t_{K2}$ corresponding with the second peak amplitude K2. The rate of decay D1 of the first pressure wave 90 is calculated according to the following equation:

$$D1 = 1000 * \frac{\ln(K1) - \ln(K2)}{t_{K2} - t_{K1}}$$

Similarly, upon a second activation of the AWG device 18, the rate of decay D2 of the second pressure wave 94 is calculated according to the following equation, where L1 is the first peak amplitude of the second pressure wave 94 measured by the sensor 26 during the second activation, L2 is the second peak amplitude, $t_{L1}$ is the time corresponding with the first peak amplitude L1, and $t_{L2}$ is the time corresponding with the second peak amplitude L2:

$$D2 = 1000 * \frac{\ln(L1) - \ln(L2)}{t_{L2} - t_{L1}}$$

(Time in all Equations Above is Expressed in Milliseconds)

After the first two AWG activations, the user interface displays the current P Value 174, representing the current percent change in decay according to the following equation:

$$P \text{ Value} = \frac{D2}{D1} * 100$$

During a third activation of the AWG device 18, a third set of dynamic pressure data is measured by the sensor 26. The current P Value 174 calculated for the first and second activations becomes the previous P Value 178 displayed on the user interface 56, and a new current P Value 174, comparing the second and third activations, is calculated according to the equations above. This process continues for subsequent activations of the AWG device 18.

A P Value greater than 100% indicates an increase in the decay rate of the pressure wave (i.e., a more rapidly attenuating wave). With reference to FIG. 4, the pressure wave 94 for the second AWG activation attenuates more rapidly than the pressure wave 90 for the first AWG activation. Accordingly, the P Value comparing these two AWG activations would be greater than 100%. A P Value less than 100% indicates a decrease in the decay rate of the pressure wave. An increase in the decay rate between subsequent AWG activations indicates that more fluid is being pushed through the screen and/or geological formation 34 (resulting in a dampening of the flow of fluid and pressure), thus indicating an improved permeability in the screen and/or the geological formation 34. As the current percent change in decay approaches 100%, subsequent AWG activations will provide little more improvement, and the user can decide to change the operational parameters of the AWG device 18 or that the process is complete.

In operation, the user positions the AWG device 18 within the bore hole 14. The user then inputs desired operational parameters into the processor 30 using the user interface 56. For example, the user can enter the static fluid level 110, the depth 114, the chamber volume 118, the burst interval 122, the cycle time 126, and the AWG operational pressure 130. Next, the user repeatedly activates the AWG device 18. High pressure gas from the gas source 22 flows through the high pressure gas line 46 and is explosively released by the ports 50 of the AWG device 18. This release generates a sharp acoustic wave and a pressure wave that impacts and vibrates the well structure. The impact loosens mineral debris, bacterial debris, or other debris that impede fluid production.

The sensor 26 measures the pressure during each activation of the AWG device 18, and the processor 30 records these pressure measurements versus time as pressure data sets. From the pressure data sets, the processor 30 calculates current and previous maximum pressure values 158, 162, current and previous affects 166, 170, and current and previous P Values 174, 178. All of the various values measured and shown on the user interface 56, and differences in the values between AWG activations, indicate the effectiveness of the process. This allows the user to make changes to the operating parameters of the AWG device 18 to improve process effectiveness while the AWG device 18 is still situated within the bore hole 14. When activation and monitoring at the selected location within the bore hole 14 is complete, the AWG device 18 can be moved to another location within the bore hole 14, and the method repeated.

Various features and advantages of the invention are set forth in the following claims.

The invention claimed is:

1. A system for monitoring the permeability of a well structure defining a bore hole, comprising:
a wave generator adapted to be positioned in the bore hole;
a sensor adapted to receive wave data generated by the wave generator; and
a processor coupled to the sensor and programmed to compare the current wave data to prior wave data in order to compare the change in permeability of the well structure, wherein the processor is programmed to calculate a correlation value that reflects changes between the prior wave data and the current wave data.

2. A system as claimed in claim 1, wherein the wave generator comprises an acoustic wave generator.

3. A system as claimed in claim 2, wherein the acoustic wave generator comprises an air gun.

4. A system as claimed in claim 1, wherein the wave generator includes a cable for suspending the wave generator in the bore hole, and wherein the sensor is supported by the cable.

5. A system as claimed in claim 1, wherein the sensor comprises one of a pressure sensor, a seismic sensor, temperature sensor and a fluid level sensor.

6. A system as claimed in claim 1, wherein the processor is programmed to calculate a decay value for the current wave data that corresponds with the rate of decay of the current wave data.

7. A method of monitoring the permeability of a well structure defining a bore hole, comprising:
creating a pressure wave in the bore hole;
sensing current wave data generated by the pressure wave; and
comparing, by a processor, the current wave data to a prior wave data in order to determine the change in permeability of the well structure, wherein comparing includes calculating a current decay value that corresponds with the rate of decay of the current wave data, calculating a prior decay value that corresponds with the rate of decay of the prior wave data, and comparing the current decay value to the prior decay value.

8. A method as claimed in claim 7, wherein creating a pressure wave includes creating an acoustic wave.

9. A method as claimed in claim 7, wherein creating a pressure wave includes inserting an air gun into the bore hole.

10. A method as claimed in claim 9, wherein comparing includes displaying values corresponding with the current wave data and the prior wave data.

11. A method as claimed in claim 7, wherein creating a pressure wave includes suspending a wave generator in the bore hole and wherein sensing current wave data includes suspending a sensor in the bore hole.

12. A method as claimed in claim 7, wherein sensing current wave data includes sensing a peak of one of a pressure wave, an acoustic wave, a seismic wave, and fluid level wave.

13. A method as claimed in claim 7, wherein comparing includes calculating a correlation value that reflects changes between the current wave data and the prior wave data.

14. A system for monitoring the permeability of a well structure defining a bore hole, comprising:
a wave generator adapted to be positioned in the bore hole;
a sensor adapted to receive wave data generated by the wave generator; and
a processor coupled to the sensor and programmed to compare the current wave data to prior wave data in order to compare the change in permeability of the well structure, wherein the processor is programmed to calculate a decay value for the current wave data that corresponds with the rate of decay of the current wave data.

15. A method of monitoring the permeability of a well structure defining a bore hole, comprising:
creating a pressure wave in the bore hole;
sensing current wave data generated by the pressure wave; and
comparing, by a processor, the current wave data to a prior wave data in order to determine the change in permeability of the well structure, wherein comparing includes calculating a correlation value that reflects changes between the current wave data and the prior wave data.

* * * * *